United States Patent [19]
Sen

[11] Patent Number: 6,148,982
[45] Date of Patent: Nov. 21, 2000

[54] COUPLING CONTROL DEVICE

[75] Inventor: Mehmet-Fatih Sen, Hemmingen, Germany

[73] Assignee: Robert Bosch GmbH, Stuttgart, Germany

[21] Appl. No.: 09/277,564

[22] Filed: Mar. 26, 1999

[30] Foreign Application Priority Data

Mar. 28, 1998 [DE] Germany .......................... 198 13 982

[51] Int. Cl.⁷ .................................................. F16D 25/10
[52] U.S. Cl. ...................... 192/87.14; 192/51; 192/109 F
[58] Field of Search .................. 192/51, 85 R, 192/87.11, 87.13, 87.14, 87.18, 87.19, 109 F; 91/31

[56] References Cited

U.S. PATENT DOCUMENTS

| | | | |
|---|---|---|---|
| 3,882,980 | 5/1975 | Blake | 192/109 F X |
| 4,086,994 | 5/1978 | Hirosawa et al. | 192/109 F |
| 5,040,653 | 8/1991 | Vulkovich et al. | |

FOREIGN PATENT DOCUMENTS

| | | |
|---|---|---|
| 0 107 193 | 5/1984 | European Pat. Off. . |
| 0 308 509 | 3/1989 | European Pat. Off. . |
| 28 47 123 | 5/1980 | Germany . |
| 31 31 420 A1 | 2/1983 | Germany . |
| 32 43 666 A1 | 5/1984 | Germany . |
| WO 87/05370 | 9/1987 | WIPO . |
| WO 88/02449 | 4/1988 | WIPO . |

*Primary Examiner*—Richard M. Lorence
*Attorney, Agent, or Firm*—Michael J. Striker

[57] ABSTRACT

A coupling control device for a coupling has at least one valve for controlling at least one coupling, and at least one throttle arrangement arranged between the at least one valve and the at least one coupling.

4 Claims, 1 Drawing Sheet

COUPLING CONTROL DEVICE

BACKGROUND OF THE INVENTION

The present invention relates a coupling control device.

Coupling control devices are generally known in the art. One of such coupling control devices is disclosed for example in the German patent document DE 32 43 666 A1. In this device, a coupling valve which is controlled by a control unit is connected to a pump. The working connection of the coupling valve loads through a working conduit the pressure chamber of a coupling.

With this construction, the process which is required for closing of the coupling is however not reliably controlled. Pressure jerks are produced when the coupling halves during closing of the coupling come to abutment with one another. This leads to momentary jerks, which on the one hand are connected with an increase wear of the coupling and the other end make uncomfortable the occupants of a vehicle. Moreover, coupling control devices are known in which a supply throttle is arranged before the coupling valve. They however have the same disadvantages.

SUMMARY OF THE INVENTION

Accordingly, it is an object of present invention to provide a coupling control device which avoids the disadvantages of the prior art.

In keeping with these objects and with others which will become apparent hereinafter, one feature of present invention resides, briefly stated, in a coupling control device with at least one valve for controlling of at least one coupling, wherein in accordance with present invention at least one throttle arrangement is provided between the at least one valve and the at least one coupling.

When the coupling control device is designed in accordance with the present invention, it eliminates the disadvantages of the prior art. In particular, it has the advantage that the filling process required for closing of the coupling is better controlled. Thereby pressure jerks are eliminated, so that wear is reduced and traveling comfort is increased.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
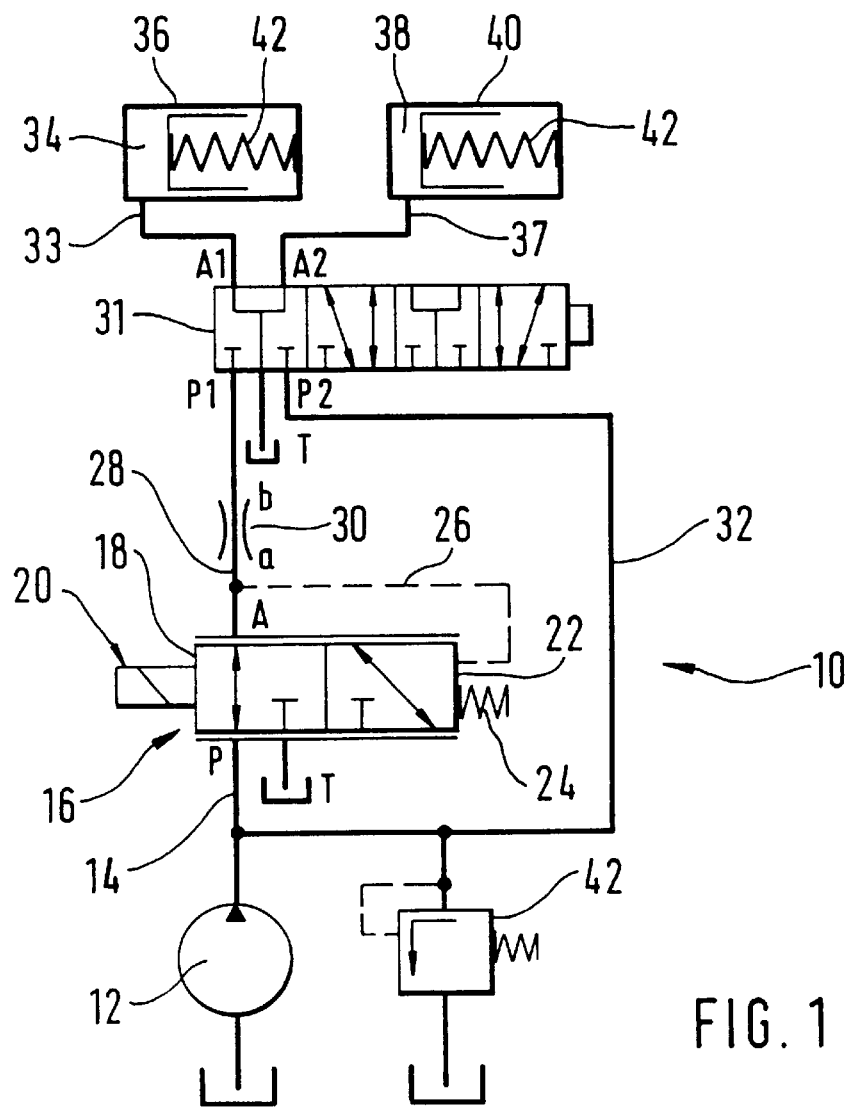
FIG. 1 is a view showing a coupling control device in accordance with the present invention.

FIG. 1 shows an electrohydraulic coupling control device 10 with a pump 12 which supplies a pressure medium from a tank T. It is connected through a first supply conduit 14 with a pump connection P of at least one coupling valve 16. The coupling valve 16 is a three-way valve which is formed as a pressure control valve. Advantageously, it is formed as a pressure reducing valve so that the pressure fluctuations in the supply conduit 14 have little impact.

A control unit 20 is provided at the first end side 18 of the coupling valve. In the shown embodiment it is formed as an electromagnet which is controlled by a not shown control electronic system. However, other control devices are possible as well, for example an electromagnetic device with a pre-control valve in form of a pressure control valve, a control electronic device, and a spring accumulator. A spring 24 and a return conduit 26 are connected with the second end side 22 of the coupling valve 16. The spring 24 is provided for residual pressure problems at low temperatures in the event of a precontrol. The return conduit 26 is connected with a working conduit 28 which is connected to the working connection A of the coupling valve 16. Thereby the pressure of the pressure medium can be adjusted in the working conduit 28 via the coupling valve 16. The coupling valve 16 is further provided with a tank connection T.

A throttle arrangement is located in the working conduit 28 and will be identified herein below as a filling throttle 30. The filling throttle 30 is formed preferably as more or less ideal screen or orifice, so that fluctuations of the temperature of the pressure medium have no influence.

The working conduit 28 loads a first pump connection P1 of a 5/4 way valve which is formed as a hand switch valve 31. The hand switch valve 31, in addition to a second pump connection P2 which is connected through the second supply conduit 32 to the pump 12, also has a tank connection T. At the outlet side, a first and a second working connection A1 and A2 are provided on the hand switch valve 31. A forward coupling 36 is connected to the first working connection A1 through a first connection conduit 33 of the pressure chamber 34, and a rearward coupling 40 is connected to the second working connection A1 through a second connection conduit 37 of the pressure chamber 38.

The forward and the rearward coupling 36, 40 are both provided with springs 42. The spring force of the springs 42 counteracts a pressure force produced in the pressure chamber 34, 38. With the forward coupling 36 a vehicle can drive for example with a stepless adjustable loop transmission forwardly, and with the rearward coupling 40 it can drive rearwardly. When the pressure chambers 34 and 38 are empty, the forward and the rearward couplings 36 and 40 are open, the pressure chambers 34 and 38 are full, and the forward and the rearward coupling 36 and 40 are closed.

A pressure limiting valve 42 is arranged in the second supply conduit 32.

Figure 2:
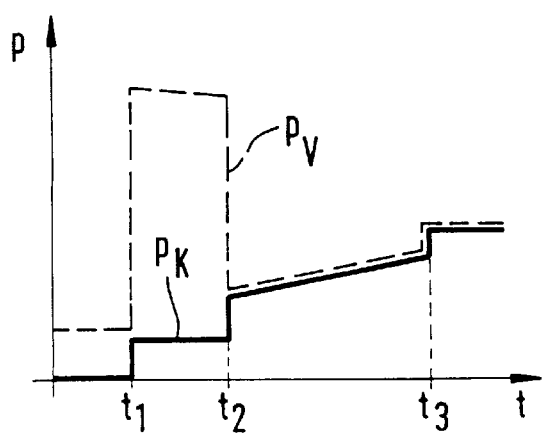
FIG. 2 is a view showing a diagram of a pressure course or time during closing process of the coupling.

A closing process of the forward coupling 36 is illustrated with the pressure course over the time t in FIG. 2. A first broken line $P_V$ shows the pressure course in the working conduit 28 before the filling throttle 30, a second solid line shows the pressure course PK in the pressure chamber 34. The hand switch valve 31 is connected so that the forward coupling 36 is in communication with the pump connection P1. Until a time point $t_1$ the coupling valve 16 can be controlled so that a pressure $P_V$ of approximately 1 bar is provided. The coupling is open and has a pressure $P_K$ of approximately 0 bar.

At the time point $t_1$ the hand switch valve 31 which is engaged by not shown position sensors activates the control electronic system of the coupling valve 16. The pressure chamber 14 of the forward coupling 36 is filled with oil. A filling process is performed. The pressure $P_V$ before the filling throttle 30 increases fast to a value of approximately 8 bar, the pressure $P_K$ increases fast to the value for example 0.8 bar. In this phase, the movable coupling halves of the forward coupling 36 are displaced from their pressureless initial position. For this displacement process a pressure force produced by the pressure PK and a volume stream are required. With the pressure force, the spring pretensioning of the forward coupling 36 is overcome and the movable coupling half is displaced. With the volume stream on the pressure chamber 34 which is increasing during the closing process is filled so long until the both coupling halves finally come to abutment against one another.

Shortly before reaching the time point $t_2$ at which the both coupling halves come to abutment against one another, the pressure $P_V$ lowers fast to approximately 2 bar. At the time $t_2$ the coupling halves come to abutment, which is shown in the diagram so that the pressure $P_K$ raises fast to approximately 2 bar, the same value of the pressure $P_V$. The both pressures $P_V$ and $P_K$ extend now along a pressure ramp until the small pressure drop at the throttle 30 and in the conduits 28 and 33 are substantially equal. During the pressure ramp, the force connection between the not shown input and output shaft of the forward coupling 36 is provided. With increased coupling pressure, the coupling slippage between the both coupling halves is reduced. The forward coupling 36 is located in the closing phase.

At the time point t3 the rotary speeds of both coupling halves are equalized so that the forward coupling 36 is closed later at this time point. The pressures $P_V$ and $P_K$ are again lifted, in correspondence with the desired safety, so that between the coupling halves no slippage occurs.

Without the filling throttle 30 the pressure $P_K$ in the conduit 28 brakes to a level which is proportional to the spring force of the forward coupling 36. Since however the coupling valve 16 as a rule at this point tries to adjust a greater pressure at its working connection A, the coupling valve 16 reacts so that it is not completely open. In this phase the coupling valve 16 can not react to control instructions by the control electronic system. This is possible when the both coupling halves of the forward coupling 36 come to abutment with one another. For a comfortable closing of the forward coupling 36 this condition is unsuitable since at the end of the filling step the volume stream can not be reduced and this volume stream builds up a pressure or a pressure peak. This pressure or this pressure peak continues as long as it is required for the valve to assume its new position. This pressure or this pressure peak can transmit in a short time a moment to the coupling, which is felt by the occupant of the vehicle as uncomfortable.

With the arrangement of the filling throttle 16 both advantages are provided. At the one hand, in the filling phase the filling volume stream and the time of the filling in combination with the throttle determination can be exactly determined and adjusted. On the other hand, it is possible at the proper time before the application of the coupling to obtain the full stream, or in other words for example to lower the control in form of a pressure ramp or in any other form, for avoiding in this way pressure peaks and to provide a comfortable closing of the forward coupling 36. The time point of the pressure lowering also depends on the values such as a pressure medium temperature, leakage, valve and spring tolerances or tolerances of the control electronic system. In the control electronic system conventionally a characteristic field is provided which carries a calculation for this condition.

Naturally, the above described invention also is applicable to the couplings which are closed by the emptying of their pressure chambers. It is to be understood that also individual couplings, for example for vehicles, write stepped automation or automated switching transmissions are also covered by the present invention.

In the case of a single coupling the hand switch valve 31 can be dispensed with.

The following alternative embodiments are also possible:

The filling throttle 30 can be further characterized in that, it is arranged between the hand switch valve 31 and the forward coupling 36; it is integrated in the hand switch valve 31 or in the coupling valve 16; and/or it is provided for example with a circular cross-sectional surface or another surface such as for example multi-cornered, four cornered, rectangular, etc. It is also recommended to control the rearward coupling 40 in the same way with a coupling valve 16 and a filling throttle 30. It is also possible to control the forward and rearward couplings 36, 40 together through a coupling valve 16 and a joint or two separate filling throttles 30.

The coupling valve 16 can be further characterized by that, one or several fine control edges can be provided, and they can have all known forms of the fine control and formed on the valve housing or on the valve piston; the coupling valve 16 can be open without current or closed without current; it can have a single stepped or a multistepped valve piston for supplying the forward and the rearward coupling 36, 40 in a predetermined way with various pressures $P_K$; the return conduit 26 can be guided outside of the coupling valve 16 or integrated in it and either guided on the end surface 22 or guided on a control edge with a multistepped valve piston. The coupling valve 16 can be supplied by a pump pressure or another auxiliary pressure, wherein due to the pressure fluctuations a throttle is arranged between the pump 12 and the coupling valve 16; a coupling valve 16 can be provided on the end surfaces 18, 22 with one or several damping throttles, so that a stable valve operation is provided; and/or the coupling valve 16 is connected with an electromagnet or an electric motor for example a stepper motor directly or through a prestage.

The forward or rearward couplings 36, 40 can be also characterized in that they can contain one or several cooling throttles or are controlled without the hand switch valve 31, wherein the coupling emptying is performed through the coupling valve 16, and in the filling phase and in the emptying phase an emptying throttle is integrated in the coupling valve 16 or the emptying throttle is arranged between the coupling valve and the tank.

The control unit 18 can be characterized in that it is formed for crossover control and/or for a control of the forward and rearward couplings 36, 40 on the slippage border.

It will be understood that each of the elements described above, or two or more together, may also find a useful application in other types of constructions differing from the types described above.

While the invention has been illustrated and described as embodied in coupling control device, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

What is claimed is:

1. A coupling control device, comprising at least one valve for controlling at least one coupling; at least one throttle arrangement arranged between said at least one valve and the at least one coupling, said valve being formed as a pressure control valve which is a pressure reducing valve for controlling a volume flow to the at least one coupling during a filling process; a control unit which is formed as a unit selected from the group consisting of a control unit formed as an electromagnet and an electromagnetic control unit with a precontrol valve; a spring and a return conduit connected with said pressure control valve; said return conduit being connected with a working conduit which is connected to a working connection of said pressure control valve, said pressure control valve being controllable so that before halves of the at least one coupling come to abutment with one another a pressure before said throttle arrangement is lowered, said at least one throttle arrangement being formed as an active throttle arrangement during filling of the at least one coupling, and which during the filling process of the at least one coupling produces a pressure drop, and after abutting of the both coupling halves a pressure before said throttle arrangement and a pressure in a pressure chamber of the at least one coupling are substantially identical.

2. A coupling control device as defined in claim 1, wherein said valve for controlling the at least one coupling is formed as a coupling valve.

3. A coupling control device as defined in claim 1, wherein said at least one valve is connected with at least one additional valve which is formed for controlling at least one forward coupling and at least one rearward coupling.

4. A coupling control device as defined in claim 3, wherein said at least one valve has a plurality of stepped valve pistons for supplying the forward coupling and the rearward coupling with different pressures.

* * * * *